Patented Aug. 9, 1932

1,870,804

UNITED STATES PATENT OFFICE

WILLIAM A. GALE AND CHARLES F. RITCHIE, OF TRONA, CALIFORNIA, ASSIGNORS, BY MESNE ASSIGNMENTS, TO AMERICAN POTASH & CHEMICAL CORPORATION, OF NEW YORK, N. Y., A CORPORATION OF DELAWARE

DETERGENT AND WATER SOFTENING PRODUCT

No Drawing. Application filed March 6, 1926. Serial No. 92,949.

This invention relates to water-softening and detergent products, and more particularly relates to products of this nature containing a double phosphate-borate salt. The invention includes improvements in methods of making these products as well as the products themselves.

In a prior application, filed January 27, 1925, Serial No. 5,157, we have described a double salt of trisodium phosphate and sodium metaborate, the chemical formula of which may be expressed as $$Na_3PO_4.NaBO_2.18H_2O$$

In the following description we shall refer to this compound as the double salt. It must be understood that although the freshly prepared salt contains the indicated eighteen molecules of water for each molecule of trisodium phosphate, considerable dehydration may occur on exposure to dry air and the resulting double salt may contain a lesser quantity of water than indicated by the formula.

We have previously described the double salt as a detergent, and, while it is in itself very efficacious, we have found it advantageous and desirable to modify its characteristics by the addition of certain other substances.

We have successfully modified the properties of our double salt and have produced crystalline detergent mixtures of special value by the admixture of borax therewith. For example:

Equal parts of borax and of our double salt are admixed to form a crystalline detergent compound which has been found especially adapted to the washing of citrus fruits. One of the valuable and unique properties of borax is its fungicidal action. By virtue of the phosphate contained within this mixture, the hardness of the water employed in such washing operations is counteracted and the grease and dirt on the fruit is emulsified and removed, leaving the greater part of the borax content to this important function of preserving the fruit from decay.

We have also modified the properties of the double salt $$Na_3PO_4.NaBO_2.18H_2O$$

and produced a crystalline product advantageously suited to certain conditions of water softening and cleansing by compounding disodium phosphate therewith. For example:

Equal parts of disodium phosphate $$(Na_2HPO_4.12H_2O)$$

and our double salt are mixed to produce a crystalline detergent compound of high phosphate content and lesser alkaline properties than the double salt. In the laundering of certain fabrics, high alkalinity or causticity is not desirable. This modified mixture is particularly useful for such purposes. The proportions of the two salts may be varied to good advantage for the laundering of various fabrics, as well as for other special uses. The high phosphate content of such mixtures, for example, makes them valuable for softening hard water.

Another method we have employed to modify the properties of the double salt and produce certain products having special advantages is the admixture of certain alkali metal carbonates such as sodium carbonate, trona, or sodium bicarbonate with the double salt. For example:

10% by weight of anhydrous soda ash ($Na_2CO_3$) is added to 90% of the double salt. The soda ash content of this composite mixture absorbs any free moisture adhering to the crystals of the double salt providing a friable, and noncaking, crystalline detergent compound.

Though the other salts mentioned above may be satisfactorily used for this purpose, the carbonates of soda are particularly desirable because of their relative cheapness and because they may be employed with advantage in many special cases. For example, the alkalinity of a solution of our double salt may be adjusted by the addition to the double salt of the necessary quantity of sodium bicarbonate. While this same effect has been accomplished by the use of sodium phosphate, we have found that very satisfactory modifications may be obtained for many purposes by the use of the less costly sodium bicarbonate.

We have found that the admixture of soap to the double salt and to the modified double salt also enhances its detergent qualities. For example:

5% by weight of soap in a finely comminuted form is added to 95% of the double salt or mixtures of the doublt salt with other alkali metal salts as previously described. The addition of the soap reduces the surface tension of solutions of the resulting detergent mixture thereby increasing the wetting, emulsifying and detergent powers of the compound. As a specific example of this, we have used this modified compound containing the double salt, both with and without borax for the washing and preserving of citrus fruits, as previously described. In all cases the compound containing the soap was found more effective in cleansing and preserving the fruit.

Modified crystalline products containing the double salt with an excess of either component ($Na_3PO_4$ or $NaBO_2$) over the ratio required by the formula $$(Na_3PO_4.NaBO_2.18 H_2O)$$

have been produced. We have found these modified double salt mixtures very advantageous for certain special uses. For example:

We have found that crystalline detergents containing equal parts of this double salt and trisodium phosphate is a singularly effective detergent in hot aqueous solution for removing grease and dirt accumulations from old automobile parts or for removing grease from other engine parts.

These modified mixtures of the new double salt may be produced in a variety of ways. One of the simplest methods for producing a modified crystalline product containing the double salt is by the mechanical co-mixing of the desired modifying agent therewith.

We have also found it advantageous to crystallize the desired product from a solution containing the proper ingredients. For example, if trisodium phosphate is added to a solution of borax and crystallization induced, a mixture may be obtained containing the double salt $Na_3PO_4.NaBO_2.18H_2O$ and borax. The desired composition of the resulting crystalline mixture may be obtained by controlling the concentration of the ingredients and the conditions of crystallization. For example:

16.5 parts by weight of trisodium phosphate ($Na_3PO_4.12H_2O$) are added to 100 parts by weight of hot aqueous solution of borax at approximately 100° C. containing 9.2% $Na_2B_4O_7$, and the solution is then cooled to 20 degrees C. to cause crystallization. Approximately 20 parts by weight of salts separate out, which salts consist essentially of equal parts by weight of borax and the double salt $Na_3PO_4.NaBO_2.—18H_2O$.

Again 15 parts by weight of trisodium phosphate ($Na_3PO_4.—12H_2O$) are added to 100 parts by weight of a hot solution of borax at approximately 100° C. containing 13.2 per cent $Na_2B_4O_7$, and the solution then cooled to 20 degrees C. to cause crystallization. In this case, approximately 27 parts by weight of the salts separate out, which salts consist essentially of 2 parts by weight of borax to 1 part of the double salt $$Na_3PO_4.NaBO_2.18H_2O.$$

We claim:

1. A crystalline water softening and detergent product containing a double salt of trisodium phosphate and sodium metaborate, and another alkali metal salt of a weak acid.

2. A crystalline water softening and detergent product containing a double salt of trisodium phosphate and sodium metaborate, another alkali metal salt of a weak acid and soap.

3. As a water softening and detergent product, a mixture of borax and a double salt of trisodium phosphate and sodium metaborate.

In testimony whereof we affix our signatures.

WILLIAM A. GALE.
CHARLES F. RITCHIE.

CERTIFICATE OF CORRECTION.

Patent No. 1,870,804.                                                      August 9, 1932.

WILLIAM A. GALE ET AL.

It is hereby certified that error appears in the printed specification of the above numbered patent requiring correction as follows: Page 2, line 7, for "sodium" read disodium; and line 18, for the mispelled word "doublt" read double; and that the said Letters Patent should be read with these corrections therein that the same may conform to the record of the case in the Patent Office.

Signed and sealed this 22nd day of November, A. D. 1932.

(Seal)                                                  M. J. Moore,
                                                           Acting Commissioner of Patents.